(12) United States Patent
Derksen

(10) Patent No.: US 8,159,203 B2
(45) Date of Patent: Apr. 17, 2012

(54) DC-DC CONVERTER WITH SWITCHABLE ESTIMATORS

(75) Inventor: Sander Derksen, Raamsdonksveer (NL)

(73) Assignee: ST-Ericsson SA, Geneva (CH)

( * ) Notice: Subject to any disclaimer, the term of this patent is extended or adjusted under 35 U.S.C. 154(b) by 617 days.

(21) Appl. No.: 11/996,714

(22) PCT Filed: Jul. 18, 2006

(86) PCT No.: PCT/IB2006/052447
§ 371 (c)(1),
(2), (4) Date: Jun. 9, 2009

(87) PCT Pub. No.: WO2007/015182
PCT Pub. Date: Feb. 8, 2007

(65) Prior Publication Data
US 2009/0267580 A1   Oct. 29, 2009

(30) Foreign Application Priority Data

Aug. 1, 2005 (EP) .................................. 05300635
Nov. 22, 2005 (EP) ................................. 05300959

(51) Int. Cl.
*G05F 1/575* (2006.01)
*G05F 1/618* (2006.01)
(52) U.S. Cl. ....................................... 323/285; 323/284
(58) Field of Classification Search .................. 323/224, 323/282, 284, 285
See application file for complete search history.

(56) References Cited

U.S. PATENT DOCUMENTS

| | | | |
|---|---|---|---|
| 5,600,234 A | 2/1997 | Hastings et al. | |
| 6,489,756 B2 * | 12/2002 | Kanouda et al. | 323/284 |
| 6,984,969 B1 * | 1/2006 | Liu et al. | 323/286 |
| 7,075,278 B2 * | 7/2006 | Uematsu et al. | 323/282 |
| 7,602,167 B2 * | 10/2009 | Trafton et al. | 323/284 |
| 2005/0127886 A1 | 6/2005 | Sase et al. | |

FOREIGN PATENT DOCUMENTS

| | | |
|---|---|---|
| JP | 08275510 A | 10/1996 |
| JP | 2001100849 A | 4/2001 |
| JP | 2001258244 A | 9/2001 |
| JP | 2004282961 A | 10/2004 |
| JP | 2005065447 A | 3/2005 |

OTHER PUBLICATIONS

International Search Report dated Jul. 30, 2007 in connection with PCT Patent Application No. PCT/IB2006/052447.
Written Opinion of the International Searching Authority dated Feb. 1, 2008 in connection with PCT Patent Application No. PCT/IB2006/052447.

(Continued)

*Primary Examiner* — Gary L Laxton

(57) ABSTRACT

A DC-DC converter is provided with a first estimator unit (RAE, RLPF, RHPF) for performing an accurate control signal estimation and a second estimator unit (FEU, ΔVEU) for performing a fast control signal estimation. In addition, a switching unit (SU) is provided for switching to an output of the first estimator unit (RAE, RLPF, RHPF) during almost constant control signal conditions and for switching to an output of the second estimator unit (FEU, ΔVEU) during changing control signal conditions to provide an estimation on the required control signal.

4 Claims, 11 Drawing Sheets

OTHER PUBLICATIONS

Derksen, S; et al "Load Current Estimation for Control Algorithms in Buck Converter" Power Electronics and Applications, 2005 European Conference on Dresden, Germany Sep. 11-14, 2005, pp. 1-10.

Martin, T. W; et al "Digital Control for Switching Converters" Industrial Electronics, 1995. ISIE '95., Proceedings of the IEEE International Symposium on Athens, Greece Jul. 10-14, 1995, vol. 2, pp. 480-484.

Lin, B-R—Institute of Electrical and Electronics Engineers: "Analysis of Fuzzy Control Method Applied to DC-DC Converter Control" Proceedings of the Annual Applied Power Electronics Conference and Exposition (APEC), San Diego, Mar. 7-11, 1993 Conference 8, pp. 22-28.

Orosco, R; et al "Discrete Sliding Mode Control for DC/DC Converters" Power Electronics Congress, 2000 CIEP, VII IEEE International, Oct. 15-19, 2000, pp. 231-236.

* cited by examiner 1. input voltage 3V
2. input voltage 4V
3. input voltage 2V 1. input voltage 3V
2. input voltage 2V 1. input voltage 3V
2. input voltage 2V

DC-DC CONVERTER WITH SWITCHABLE ESTIMATORS

CROSS-REFERENCE TO RELATED APPLICATION(S)

The present application claims priority under 35 U.S.C.§365 to International Patent Application No. PCT/IB2006/052447 filed Jul. 18, 2006, entitled "DC-DC CONVERTER WITH SWITCHABLE ESTIMATORS". International Patent Application No. PCT/IB2006/052447 claims priority under 35 U.S.C.§365 and/or 35 U.S.C.§119(a) to European Patent Application No. 05300635.9 filed Aug. 1, 2005 and European Patent Application No. 05300959.3 filed Nov. 22, 2005 and which are incorporated herein by reference into the present disclosure as if fully set forth herein.

FIELD OF THE INVENTION

The invention relates to a DC-DC converter, a method for converting DC voltages and a device with a DC-DC converter, particularly a mobile device.

BACKGROUND OF THE INVENTION

Converters for converting a DC voltage in a DC voltage, typically measure the inductor current and the output/capacitor voltage and use these measurements as input for the controller for the DC-DC conversion. As a response to the occurrence of errors in the state is desired, the errors in the state need to be known so besides the measured current state, also the required state should be known, which may consist of the required inductor current and the required capacitor/output voltage. Typically the output voltage corresponds to the state variable which will be controlled, and the value thereof will typically be known. However, the also required inductor current is more difficult to obtain. The relation between the inductor current and other system parameters may differ depending on the particular type of DC-DC converter. However, the inductor current will always depend on the load current. If this load current is not known, it may be considered as a disturbance from the outside of the system.

Instead of determining the particular load current, it may also be possible to determine further currents or voltages within the circuit to determine the required inductor current indirectly or the error in the inductor current directly. For example, in a so-called buck converter, the error in the inductor current will correspond to the capacitor current and can be determined directly.

The load current may be determined by measuring the load current. However, in order to measure the current, a resistor typically is placed in series with the load. If a relatively large resistance is used, accurate measurements will be enabled, but this will on the other hand lead to a greater power dissipation and a greater voltage drop during transients. On the other side, a smaller resistor will make it more difficult to measure the current accurately and a very sensitive and accurate operation amplifier will be required. Furthermore, if the load current is to be determined by measurement, these current measurements of the inductor current and the load current need to be matched as the error in the inductor current is a function of the measured actual inductor current and the load current.

Alternatively, the load current is not measured in several control systems but it can be compensated via a control loop. For the case that the load current is present in the control loop, such a situation is referred to as estimation of the load current. In other words, such an estimator for a disturbance from the outside may be referred to as a disturbance estimator.

FIG. 1 shows a block diagram of a complete converter system according to the prior art. The converter comprises a switching converter unit SCU, an estimator unit EU with a required estimator unit REU and a controller CU. The switching converter SCU comprises three inputs, namely the input voltage $V_{in}$, the load current $I_{load}$ and the duty-cycle d. It should be noted that merely the duty-cycle d of these three inputs can be controlled by the controller CU. The other two inputs are determined by further external elements. The outputs of the switching converter SCU are the inductor current $i_L$ and the capacitor voltage $v_C$. These two outputs can be measured and constitute the output signals. The inductor current $i_L$ and the capacitor voltage $v_c$ are input to the estimator unit EU. Furthermore, the capacitor voltage $v_c$ is forwarded to a summation unit SUM where a reference voltage $V_{ref}$ is subtracted from the capacitor voltage $V_C$ in order to determine the error $ev_c$ in the capacitor voltage. In the estimator unit EU the error EIE in the inductor current is determined. Apart from the error $ev_c$ in the capacitor voltage and the error in the inductor current EIE, also the required capacitor voltage $V_{cref}$, the required inductor current $i_{LREF}$, the input voltage $v_{in}$ and possibly some other parameters may constitute inputs for the controller CU. The controller CU outputs the duty-cycle d as output signal. The estimator EU may receive the inductor current $i_L$, the capacitor voltage $v_c$ and the duty-cycle as input signals. The outputs of the estimator unit EU constitute the required inductor current RIE and the error in the inductor current EIE. Accordingly, the controller CU does not need to know the load current as the relation of the required inductor current on the load current is dealt with in the estimator.

In the article "Discrete sliding mode control for DC/DC converters", Power Electronics Congress, 2000 CIEP 2000, VII IEEE International, 15-19 Oct. 2000, Pages 231-236 by Orosco et al., a DC-DC converter is shown, wherein an estimation of the error in the inductor current is obtained by high pass filtering of the measured inductor current.

SUMMARY OF THE INVENTION

It is an object of the invention to provide a DC-DC converter that allows an improved control signal estimation.

This object is solved by a DC-DC converter according to claim 1, by a method for DC-DC conversion according to claim 10 and a mobile device according to claim 11.

Therefore, a DC-DC converter comprises a first estimator unit for performing an accurate control signal estimation and a second estimator unit for performing a fast control signal estimation. In addition, a switching unit is provided for switching to an output of the first estimator unit during almost or substantially constant control signal conditions and for switching to an output of the second estimator unit during substantially changing control signal conditions to provide an estimation on the required control signal.

Accordingly, the estimation of the control signal can be performed by an estimator which is best for the particular estimation according to the current signal condition. Hence, an accurate but slow estimator is used during substantially constant control signal conditions and a fast but less accurate estimator is used during changing control signal conditions.

According to an aspect of the invention, the DC-DC converter comprises an inductor and an output capacitor which are coupled to a load. Here, the first estimator unit estimates a required inductor current for a load by measuring a low frequency part of an inductor current, wherein the required inductor current constitutes a control signal. The second estimator estimates a required inductor current for a load by measuring voltage changes on the output capacitor. Hence, this DC-DC converter can estimate a required inductor current accurately or fast according to the current signal conditions.

According to a further aspect of the invention, the second estimator unit receives the voltage of the output capacitor and the inductor current at the start and the end of a last period and outputs an estimation on the required inductor current based on a subtraction of a capacitor current from the measured inductor current. The capacitor current is determined by multiplying the voltage changes on the output capacitor with a value of the output capacitance and by dividing the result thereof by the time period. Therefore, the required inductor current can be estimated by simple multiplication and division steps.

According to still a further aspect of the invention, the second estimator unit receives the voltage of the output capacitor and the inductor current and outputs an estimation on the required inductor current based on a subtraction of the capacitor current from the measured inductor current. A derivative of the output capacitor voltage is multiplied with the value of the output capacitance in order to determine the capacitor current.

According to an aspect of the invention, the second estimator unit receives the voltage of the output capacitor and a duty cycle and outputs an estimation on the required inductor current. The estimation is performed by subtracting the capacitor current from the result of a multiplication of the measured inductor current by one minus the duty cycle. The result of the subtraction is divided by a result of a low pass filtering of one minus the duty cycle. The capacitor current is determined by multiplying the voltage changes on the output capacitor with the value of the output capacitance and by dividing this by the time period.

According to still a further aspect of the invention, the second estimator unit receives the voltage of the output capacitor and the output inductor current as well as the duty cycle. The second estimator outputs an estimation on the required inductor current. The estimation is performed by subtracting a capacitor current from the result of a multiplication of the measured inductor current by one minus the duty cycle. The result of the subtraction is divided a result of low pass filtering of one minus the duty cycle. A derivative of the output capacitor voltage is multiplied by the value of the output capacitance to determine the capacitor current.

The invention also relates to a method for DC-DC conversion. An accurate control signal estimation, and a fast control signal estimation is performed. It is switched to the output of the accurate control signal estimation during substantially constant control signal conditions and to an output of the fast control signal estimation during substantially changing control signal conditions in order to provide an estimation on the required control signal.

The invention furthermore relates to a mobile device with a DC-DC converter comprising a first estimator for performing an accurate control signal estimation and a second estimator for performing a fast control signal estimation. In addition, a switching unit is provided for switching to an output of the first estimator during almost or substantially constant control signal conditions and for switching to an output of the second estimator unit during substantially changing control signal conditions to provide an estimation on the required control signal.

The invention relates to the idea to provide a switching estimator which combines two estimating principles into a single estimator. The accurate estimator is slow but accurate such that it constitutes a good solution for constant load conditions while the fast estimator is fast but not very accurate. Accordingly, for constant conditions with a constant current load, the accurate estimation will be used while during changing conditions after a load change the fast estimator is used. Therefore, the different load conditions are differentiated. During constant load conditions the capacitor voltage is constant while a significant change in the load conditions will result in a change in the capacitor voltage. Accordingly, the capacitor voltage can be used to differentiate between load conditions. If the delta of the capacitor voltage is small, the load conditions are constant and the accurate estimator can be used. If the delta of the capacitor voltage $V_c$ exceeds a predetermined limit, the load conditions are changing and the fast estimator will be required.

Other aspects of the invention are defined in the dependent claims.

The embodiments of the invention, and their the advantages are now described in more detail with reference to the drawings:

DESCRIPTION OF THE PREFERRED EMBODIMENTS

A first embodiment of the invention relates to a DC-DC converter which comprises a switching estimator. The switching estimator is able to switch between an accurate estimator and a fast estimator based on the load conditions of the DC-DC converter.

Estimating a required inductor current can be performed by a first estimator, i.e. an accurate estimator, wherein an averaging is used to achieve an accurate estimation. However, such an accurate estimator has a slow response to changes. The estimation is performed by using the low frequency part of the measured inductor current, i.e. a low pass filter estimator is used. Within a steady state, the average of the inductor current over an amount of several periods corresponds to the required inductor current for the average of the present load current. In other words, low frequency components of both these currents should correspond to each other. Accordingly, the low frequency parts of the inductor current can be used to estimate the required inductor current. However, due to the low pass filtering characteristics such an estimator is slow although accurate and not noise sensitive.

According to a second estimator, which is referred to as a fast estimator, the most recent data for responding to any changes of the loads is used. Such an estimator is fast but not very accurate. Such an estimator may also be referred to as delta capacitor voltage $\Delta v_c$ estimator as it uses the measured capacitor voltage and the inductor current in order to perform an estimation of the required inductor current for the present load current. If any changes in the capacitor voltage $V_c$ are measured and the output capacitance is known, the capacitor current can be calculated. Accordingly, it can be seen to what extent the current supply to the load originates from the switched inductor current itself. If both these currents are equal, the capacitor current will be zero. If the error in the current supply to the load is known, the difference between the present inductor current and the required inductor current may be calculated. This can be performed by utilizing the relation between the load current and the inductor current within a steady state depending on the converter type and input versus output voltage ratio. For the case of a buck converter the average inductor current equals the average load current in steady state. Although the delta voltage estimator can respond very fast to changes, it is also very sensitive to noise and is thus less accurate in particular during almost constant conditions when compared to the accurate estimator.

Figure 1:
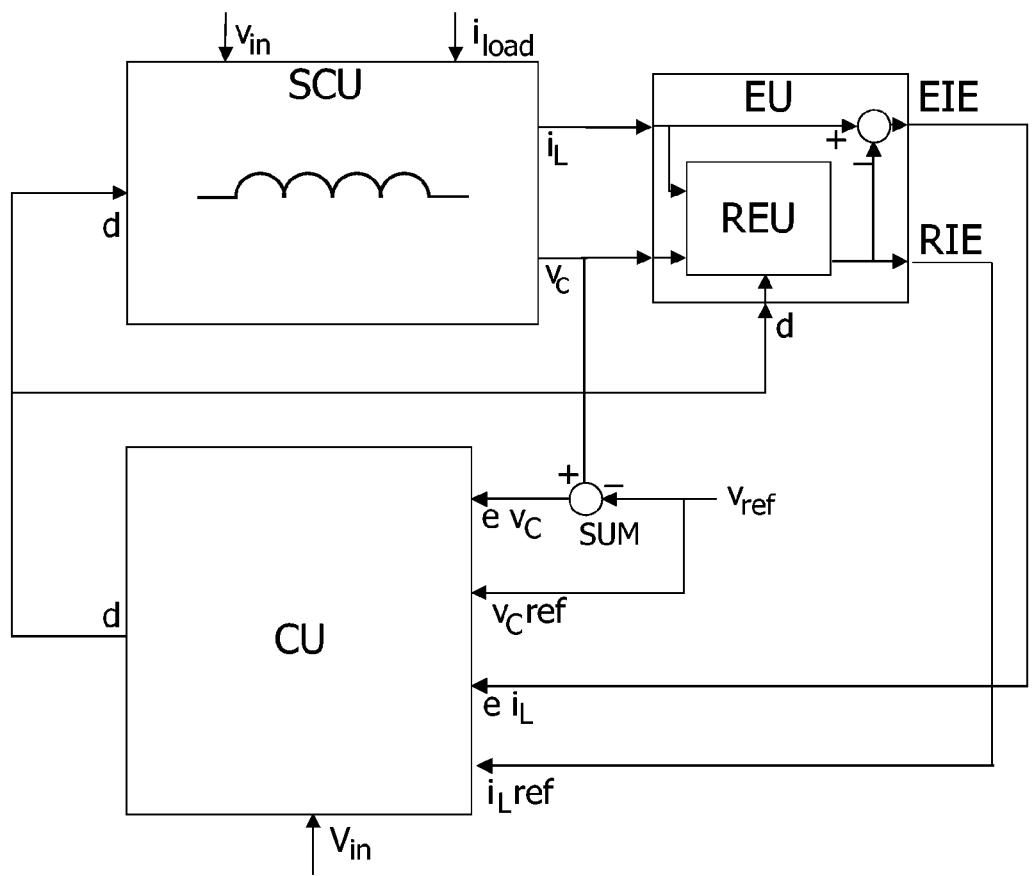
FIG. 1 shows a block diagram of a complete converter system according to the prior art.
Figure 2:
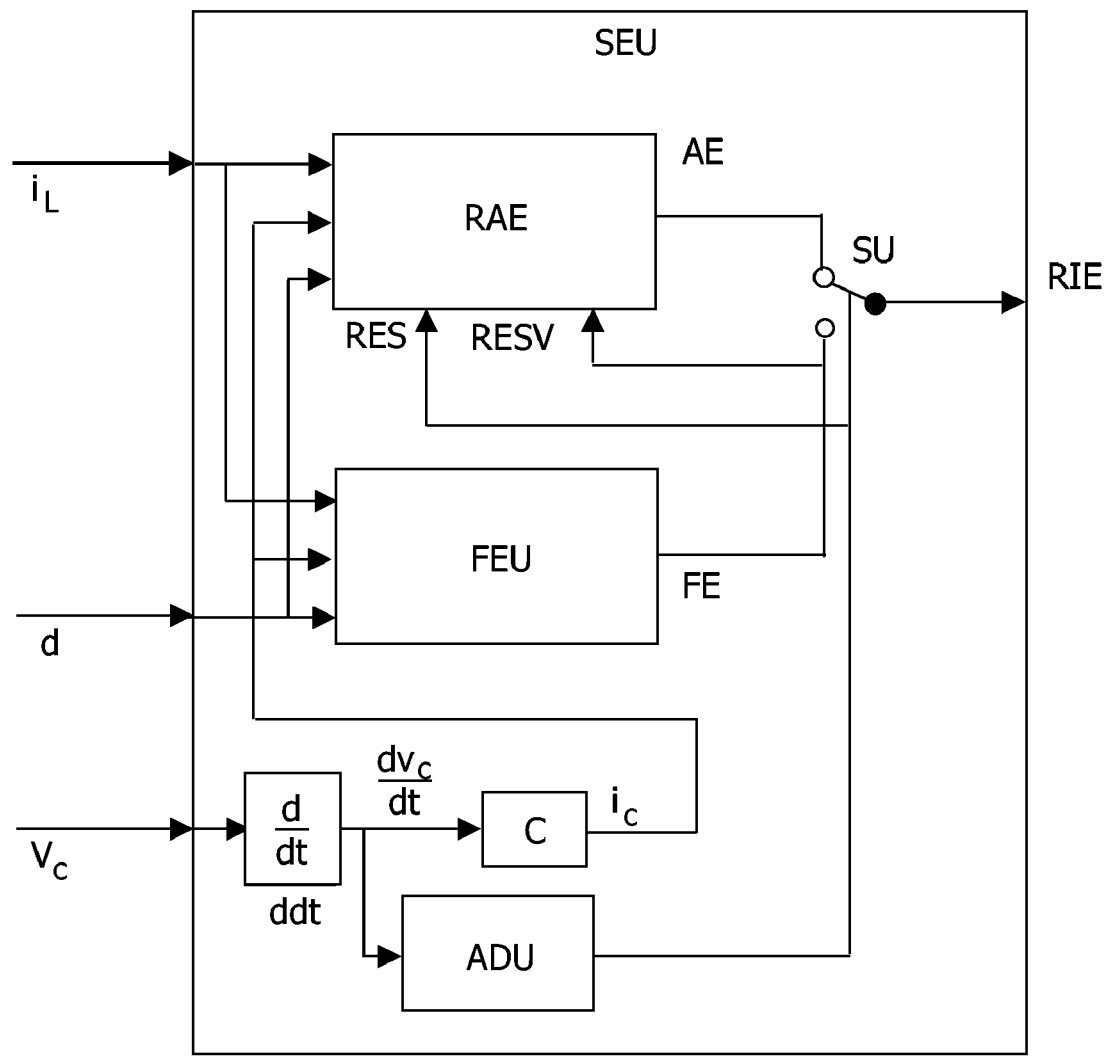
FIG. 2 shows a block diagram of a switching estimator according to a first embodiment.

FIG. 2 shows a block diagram of a switching estimator according to a first embodiment. Such a switching estimator SEU may be used in the converter system according to FIG. 1, wherein the estimator EU is replaced by the switching estimator according to FIG. 2. The switching estimator comprises a resettable accurate estimator RAE, a fast estimator FEU, an amplitude detector ADU and a switching unit SU for switching between the resettable accurate estimator RAE and the fast estimator FEU. Both these estimators use different input signals according to the particular type of the DC converter. According to the state of the switching unit SU, the output of one of the estimators is used as output signal, namely the required inductor current estimation RIE. The switching unit SU is coupled to the amplitude detector unit ADU and is thus controlled as a function of the variations in the capacitor voltage $V_c$. The derivative of the capacitor voltage Vc is determined in the d/dt block ddt. The amplitude detector ADU unit decides based on this derivative whether the variations in the capacitor voltage is large enough to switch to the fast estimator FEU as this estimator should be used during and after load changes. The resettable accurate estimator RAE can be reset and can start with a new initial reset value RESV. The last estimation from the fast estimator FEU which constitutes the best available estimation after a load change may be used as reset value RESV.

Figure 3:
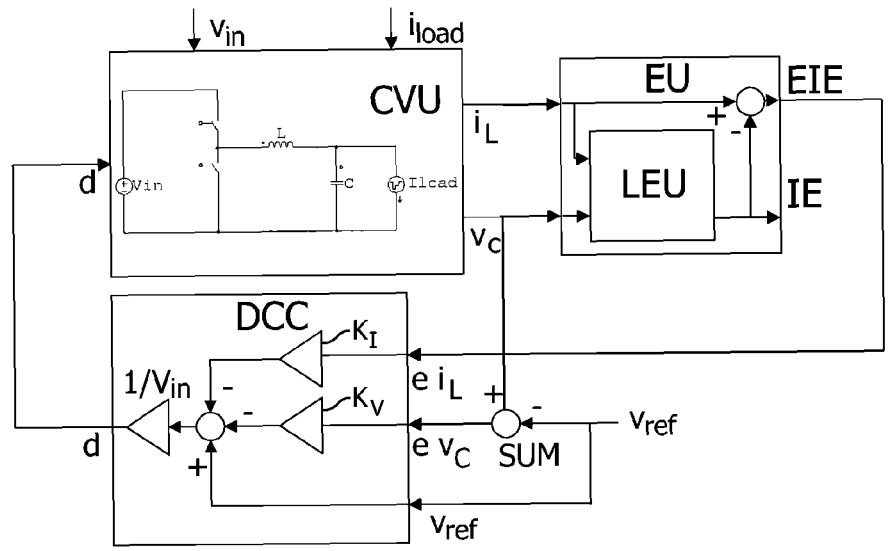
FIG. 3 shows a block diagram of a DC converter according to the second embodiment.

FIG. 3 shows a block diagram of a DC converter according to the second embodiment. Here, a buck converter is depicted, wherein the relation between the load current and the inductor current during steady state is quite simple as they are equal. Accordingly, the required inductor current is equal to the load current and the required inductor current estimation can be referred to as load current estimation. The converter comprises a converter CVU, an estimator unit EU having a load estimator unit LEU and a duty-cycle controller DCC. The estimator unit receives the inductor current $i_L$ and the capacitor voltage $V_C$ as input and outputs a load current estimation IE and an error in the inductor current estimation EIE. Accordingly, the duty-cycle controller DCC is used to control the overall buck converter. The output of the duty-cycle controller DCC corresponds to the duty-cycle of the converter CVU. Accordingly, the output of the duty-cycle controller DCC constitutes the input signal of the converter CVU.

Figure 4:
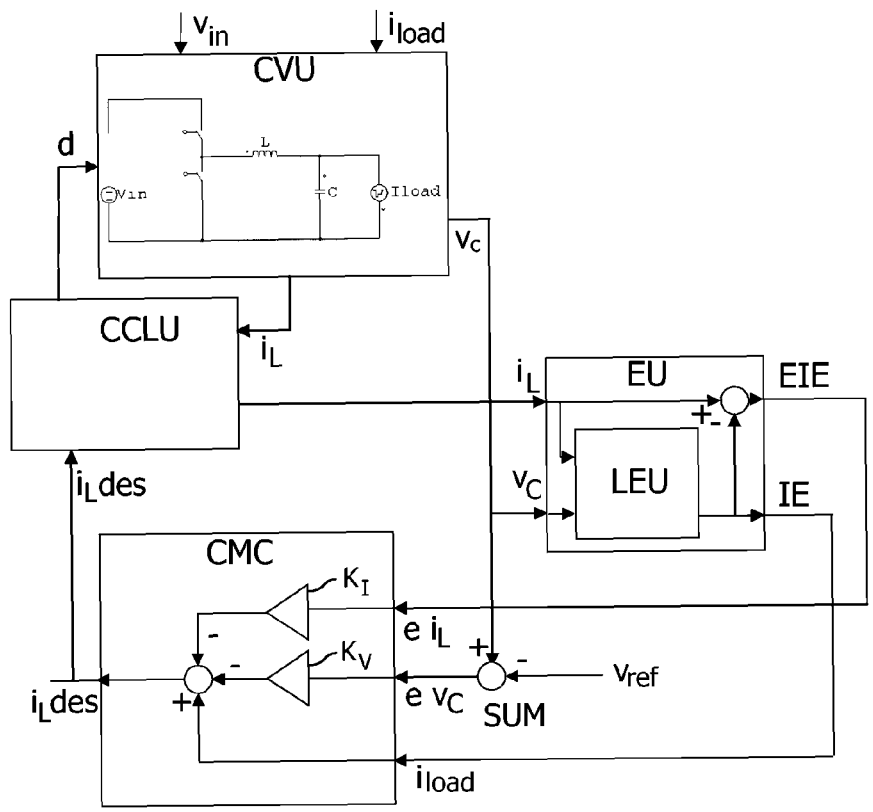
FIG. 4 shows a block diagram of a DC converter according to the third embodiment.

FIG. 4 shows a block diagram of a DC converter according to the third embodiment. The converter comprises a converter CVU, an estimator unit EU, a current mode controller CMC and an inner current control loop CCLU. Here, a linear current mode controller CMC is used to control the buck converter. The output of the current mode controller CMC constitutes the desired current which should flow through the inductor. A separate inner current control loop CCLU is therefore required. The output of the inner current control loop CCLU constitutes the information regarding the inductor current and is output to the estimator unit EU.

Within an alternative embodiment, a boost converter instead of a buck converter may be implemented which corresponds to the general converter system as shown in FIG. 1.

Figure 5:
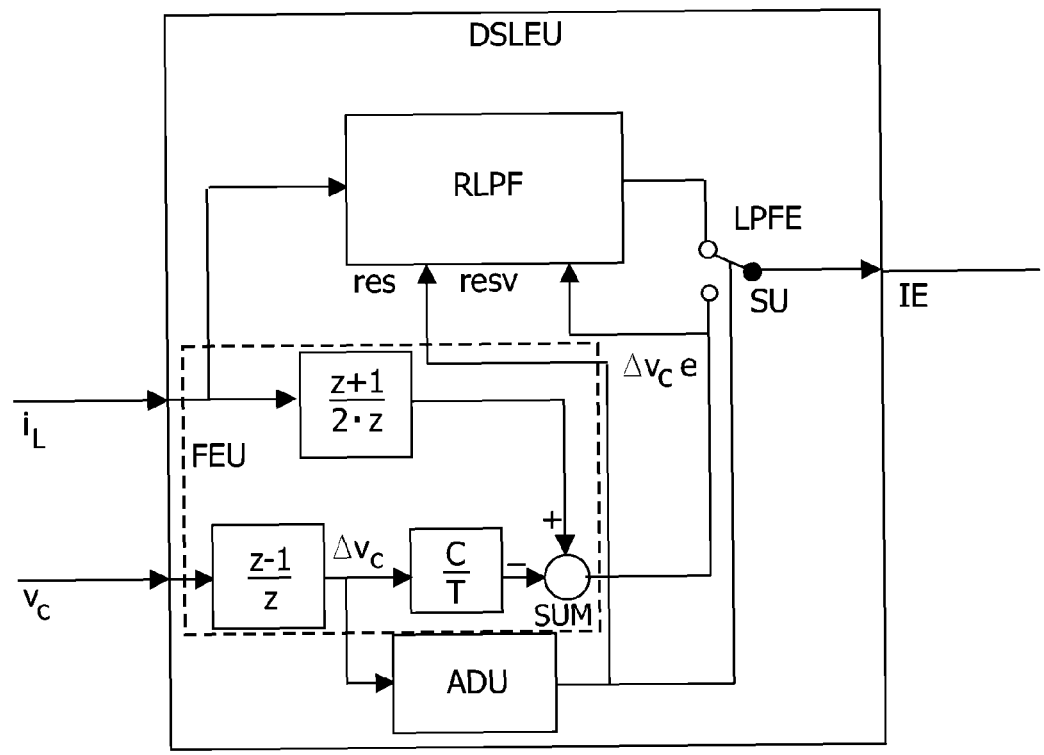
FIG. 5 shows a block diagram of a switching estimator according to a fourth embodiment.

FIG. 5 shows a diagram of a switching estimator DSLEU according to a fourth embodiment. Here, a fast estimator FEU is implemented as a discrete-time implementation using the measured capacitor voltage Vc and the inductor current $i_L$ at the start and the end of the last period in order to estimate the load current. In other words, a delta capacitor voltage estimator is implemented.

If the change in capacitor voltage $v_c$ during one period is accurately measured and the output capacitance C is known, then the average capacitor current during this period can be calculated, according to (1), by multiplying the voltage change with the capacitance value C and dividing it by period T.

$$\overline{i_C}[k] = \frac{C}{T} \cdot (v_C[k] - v_C[k-1]) \rightarrow \overline{i_C}(z) = \frac{C}{T} \cdot \frac{(z-1)}{z} \cdot v_C(z) \quad (1)$$

In (1), the right hand side expresses the z-domain equivalent of the discrete-time expression on the left hand side. The inductor current $i_L$ is also measured, such that the average inductor current during one period can be calculated too, by taking the average of the inductor current at the start and end of the last period, as shown in (2).

$$\overline{i_L}[k] = \frac{1}{2}(i_L[k] + i_L[k-1]) \rightarrow \overline{i_L}(z) = \frac{z+1}{2z} \cdot i_L(z) \quad (2)$$

As the load current $i_{load}$ is equal to the inductor current minus the capacitor current, the average load current during the last period can be calculated in (3), by subtracting the result of (2) from (1).

$$\overline{i_{load}}[k] = \overline{i_L}[k] - \overline{i_c}[k] \quad (3)$$

The estimation for the load current $i_{load}$ corresponds to the average that was calculated for the last period.

Accordingly, FIG. 5 shows a block diagram of the $\Delta v_C$ estimator, implementing Equs (1), (2) and (3), and which forms a part of the total switching estimator. The estimator comprises a resettable low pass filter RLPF which corresponds to the resettable accurate estimator RAE according to FIG. 2. The fast estimator unit FEU is implemented by the discrete time $\Delta v_C$ estimator.

Figure 6:
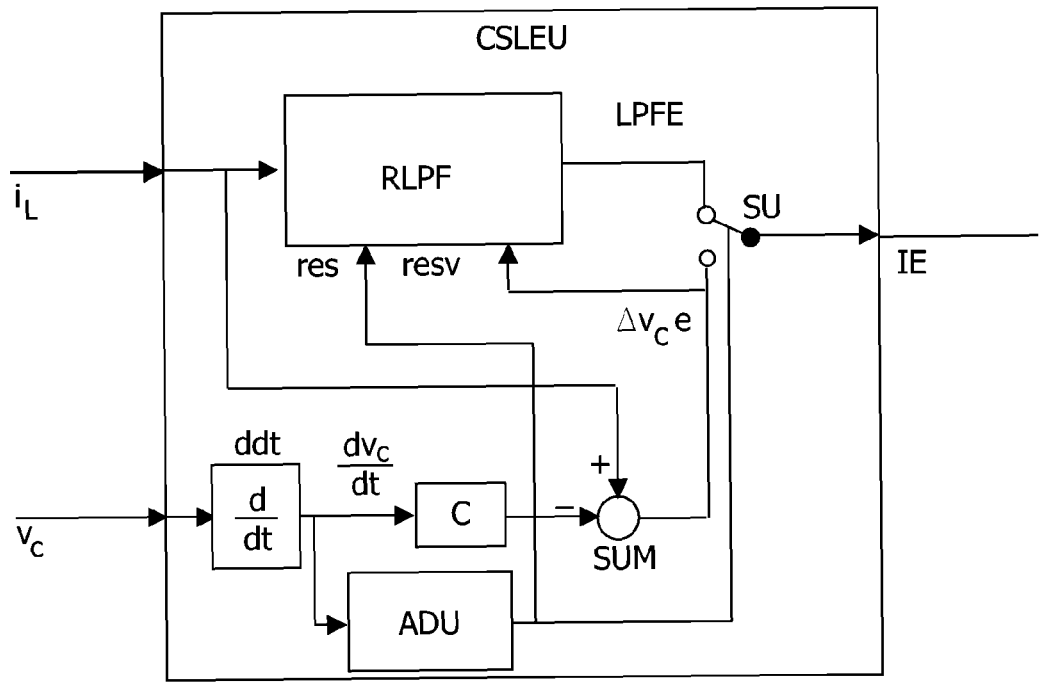
FIG. 6 shows a block diagram of a switching estimator according to a fifth embodiment.

FIG. 6 shows a block diagram of a switching estimator CSLEU1 according to a fifth embodiment. Here, the fast estimator is implemented as a continuous time implementation which constitutes an equivalent implementation as compared to the load estimator according to FIG. 5. Here, the measured capacitor voltage $V_C$ and inductor current $i_L$ are used to estimate the load current $i_{Load}$. Accordingly, this estimator may also be referred to as delta capacitor voltage estimator. In this continuous time case, the derivative of the capacitor voltage $v_C$ obtained by the d/dt block ddt is used to calculate the capacitor current by multiplying it with the capacitance value of C. By subtracting this capacitor current ic from the measured inductor current $i_L$ in the summation unit SUM, the load current $i_{load}$ results, which then forms the load current estimation of the $\Delta v_C$ estimator. The resettable accurate estimator is implemented by a resettable low pass filter RLPF. The switching unit SU decides according to the output of the amplitude detection unit ADU to switch to the output of the resettable low pass filter RLPF (the accurate estimator) or to the output of the summation unit SUM which constitutes the output of the fast estimator.

Figure 7:
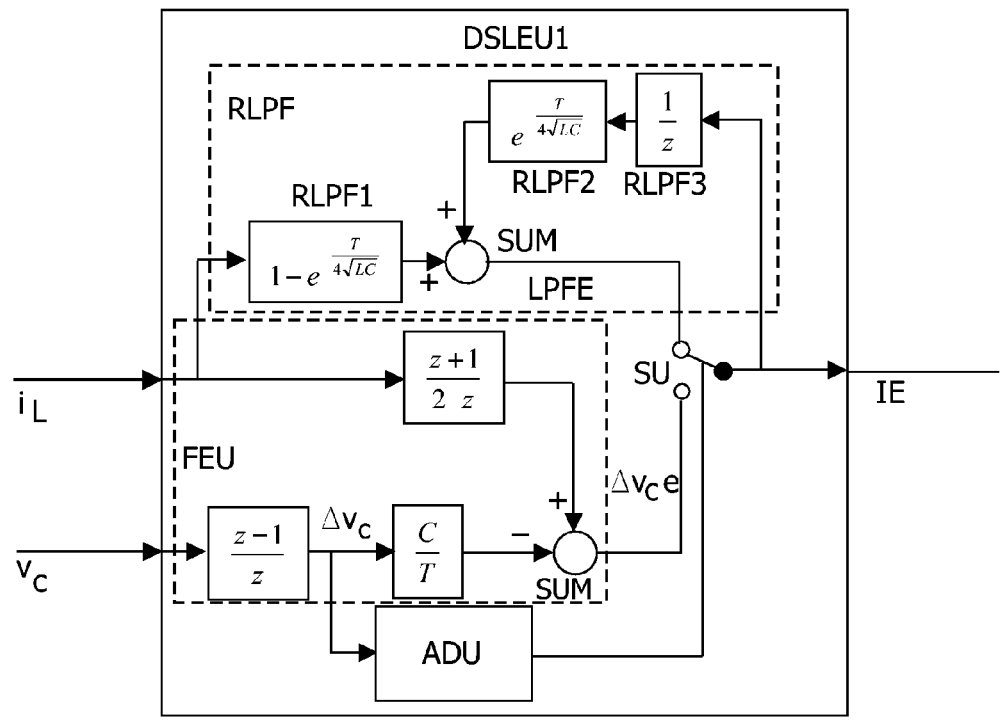
FIG. 7 shows a block diagram of a switching estimator according to a sixth embodiment.

FIG. 7 shows a block diagram of a switching estimator according to a sixth embodiment. In FIG. 7, a detailed implementation of a low pass filter estimator RLPF which is resettable is shown for a discrete-time implementation of the converter according to FIG. 5. Here, the low pass filter RLPF is shown in more detail. In particular, the low pass filter RLPF comprises low pass filter units RLPF1-RLPF3. The cut off frequency of the low pass filter RLPF should not be higher than the resonance frequency of the LC filter of the buck converter. Furthermore, the bandwidth of the low pass filter RLPF should not be chosen to small because the estimator might become very slow. By choosing the low pass filter RLPF as a first order IIR filter, the estimated load current $I_{load-est}[k]$ at the clock cycle k is given in equation (4):

$$i_{load-est}[k] = \left(1 - e^{-\frac{T}{4\sqrt{LC}}}\right) \cdot i_L[k] + e^{-\frac{T}{4\sqrt{LC}}} \cdot i_{load-est}[k-1] \quad (4)$$

Here, the LPF cut-off frequency is chosen at ¼ of the LC resonance frequency.

For providing the ability of the estimator to be reset, the feedback loop RLPF2, RLPF3 is provided from a position behind the switch SU. As the low pass filter estimation is based on an infinite impulse response, the estimation will depend on more than two previous periods. Accordingly, additional measures (as in extra action/circuitry is required) may be required if the conditions are constant after previous changes and the switch unit SU within the estimator switches from the delta capacitor voltage estimation to the low pass filter estimation. As any previous values from the low pass filter estimation is not relevant anymore, the low pass filter estimation needs to be reset. The last value from the delta capacitor voltage estimator may be used as an initial value for the low pass filter estimator if a switching is performed from the delta capacitor voltage estimator to the low pass filter estimator. As the value after the switch SU is used as feedback information, this feedback is automatically achieved for the correct moment and the most relevant information is used for the low pass filter estimator.

Figure 8:
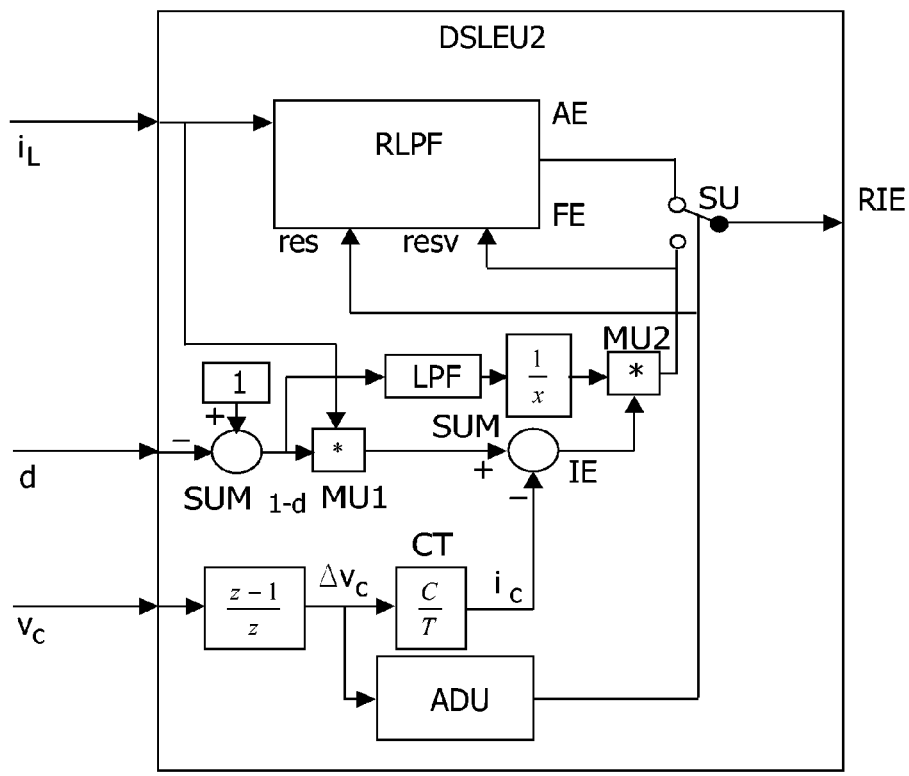
FIG. 8 shows a block diagram of a switching estimator according to a seventh embodiment.

FIG. 8 shows a block diagram of a switching estimator according to the seventh embodiment. In particular, an embodiment of a switching estimator DSLEU2 for a boost converter is shown wherein the accurate estimator is implemented as a resettable low pass filter estimator RLPF which can be set and wherein the fast estimator is implemented as a delta capacitor voltage estimator. It should be noted that the implementation of a delta capacitor voltage estimator as fast estimator for a boost converter is different than the implementation for a buck converter as the duty cycle is also used as an input signal for the estimator. The capacitor voltage change in one period $\Delta v_C$ can be used in order to calculate the average capacitor current $i_c$ during the previous period. This can be performed by multiplying the average capacitor current $i_c$ with the capacitance C and by dividing it by the period T.

The average current during the last period flowing through the synchronous switch to the output is calculated by multiplying the inductor current $i_L$ (the current flowing through the switch) in a multiplication unit MU1 by one minus the duty-cycle: 1−d (the part of the period time this current is flowing). By subtracting the average capacitor current $i_C$ obtained from a C/T block CT from the average switch current, i.e. the output from the multiplication unit MU1, the average load current IE, i.e. the load current estimation during the last period is achieved. Now the required inductor current $i_L$ can be determined if the relation between the load and required inductor current is known. For steady state this relation is given by the duty-cycle d, as the load current then equals the inductor current times 1−d. If the average of 1−d is taken over a large enough amount of time by using a low pass filter LPF, then the average 1−D results and this should be more or less equal to the steady state 1−d. So load current estimation IE is multiplied with 1/(1−D) in the multiplication unit MU2 to obtain the required inductor current estimation of the fast estimator.

Now the principle of a state feedback is described in more detail: The idea of feedback control is to make the control inputs of a system responsive to the present condition of the system. For optimal control the complete state of the system, described by the state variables of that system, needs to be known. With state feedback control, each controller output is a function of the errors in all state variables. The errors in the state variables relate to the differences between the current and the desired state variables of the system.

In case of the buck converter only one controllable input, namely the duty cycle d is present, so the controller will have one output. The state of the buck converter consists of two state variables, the inductor current $i_L$ and capacitor voltage $v_C$, so the state feedback controller will have two inputs for the errors in both state variables.

The outputs of a linear state feedback controller are linear combinations of all errors in the state variables. The buck converter controller thus consists of two gains, one for the error in the inductor current and one for the capacitor voltage error. The linear combination of the errors gives the desired halfbridge voltage. By dividing this desired halfbridge voltage by the converter input voltage, the controller output, the duty cycle results.

The system consisting of the buck converter and the linear state feedback controller is a $2^{nd}$ order system, having two state variables and two feedback gains. The poles of the system can be placed at the desired position by choosing the appropriate gains.

If the controller is implemented in the digital domain, AD converters are used to measure the inductor current and the capacitor voltage.

The errors in the state variables required for the state feedback control constitute the deviations of the current state variables from the desired state variable values. For the buck converter, both current state variables, the inductor current and capacitor voltage are measured. The desired value for the capacitor voltage is the desired output voltage of the buck converter, which of course is known. The desired average inductor current is equal to the load current, because only then the output voltage will remain constant, as the average current into the output capacitor will be zero. A standard approach to measure the current would be to insert a resistor in series with the load. This has the drawback that when choosing a relative large resistance to enable accurate measurement, there will be a considerable dissipation in the resistor and the voltage drop during transients will be larger. With a small resistance value on the other hand, it is difficult to measure the voltage drop over the resistor accurately. In contrast, the estimator according to the invention does not suffer from either of these drawbacks.

Instead of measuring the load current, it is also possible to estimate it, based on the available information. This estimated load current can then be subtracted from the measured inductor current to get the estimated error in the inductor current, which is required as input for the state feedback controller.

Figure 9:
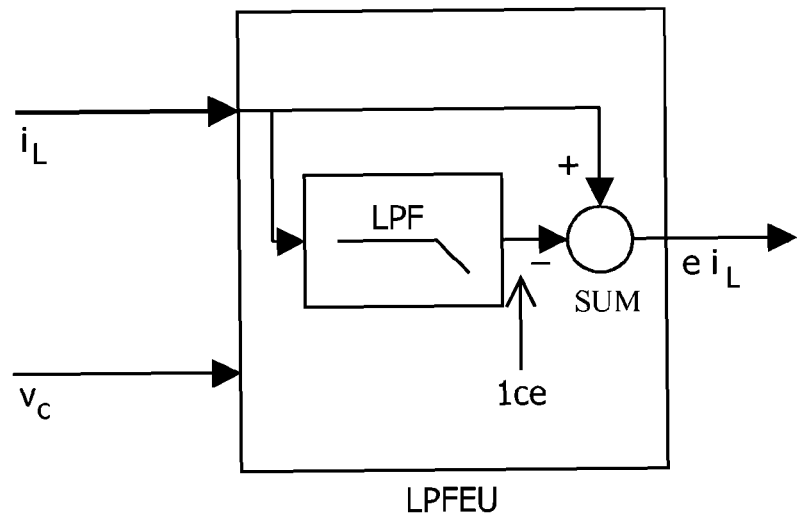
FIG. 9 shows a block diagram of a load current estimator according to a eighth embodiment of the invention.

FIG. 9 shows a block diagram of a load current estimator according to an eighth embodiment of the invention. Here, low pass filter load current estimator CPFEU is implemented which uses low frequency part of the measured inductor current. The average of the inductor current over an amount of periods is equal to the average of the load current during steady state. Accordingly, the low frequency content of both currents should be the same. The low frequency part of the inductor current is now used as an estimate for the load current.

For reasons of stability, the LPF cut-off frequency should not be chosen too high, and should certainly not be higher than the resonance frequency of the LC filter in the converter. On the other hand, the LPF bandwidth should not be too small, because that would make the estimator very slow. Good results can be obtained by choosing the LPF as a first order IIR filter, resulting in the estimated load current $i_{load\text{-}est}[k]$ at clock cycle k as given in (4).

The LPF cut-off frequency is chosen at ¼ of the LC resonance frequency.

Figure 10:
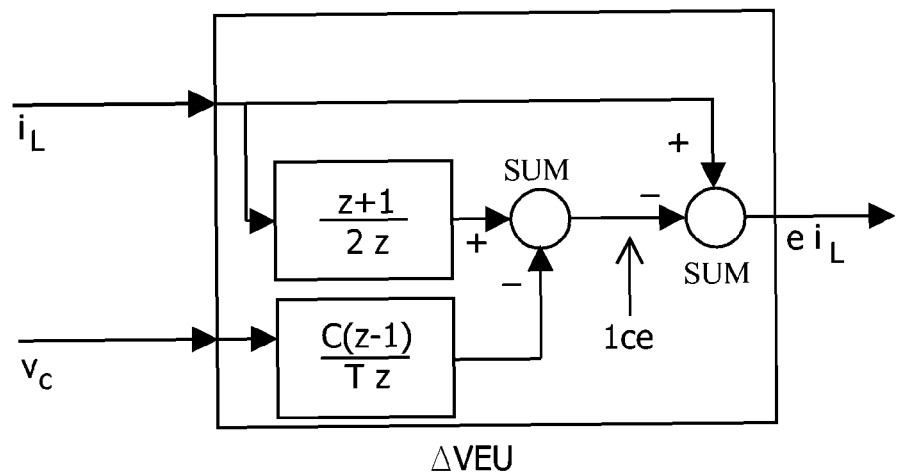
FIG. 10 shows a block diagram of a load current estimator according to a ninth embodiment.

FIG. 10 shows a block diagram of a load current estimator according to a ninth embodiment. Here, a delta capacitor voltage estimator ΔVEU is shown which implements the equation (2-4). The delta capacitor voltage ($\Delta v_C$) estimator ΔVEU uses both the measured capacitor voltage and inductor current at the start and end of the last period, to estimate the load current. If the change in capacitor voltage $v_C$ during one period is accurately measured and the output capacitance C is known, then the average capacitor current during this period can be calculated, as described above with reference to equ. (1), by multiplying the voltage change with the capacitance value C and dividing it by period T.

The inductor current $i_L$ is measured such that the average inductor current during one period can be calculated as well by taking the average of the inductor current at the start and end of the last period as shown in equ. (2). As the load current $i_{load}$ is equal to the inductor current minus the capacitor current, the average load current during the last period can be calculated as described in equ. (3) by subtracting the result of equ. (2) from equ. (1). The estimation for the load current $i_{load}$ now is the average that was calculated for the last period.

Figure 11:
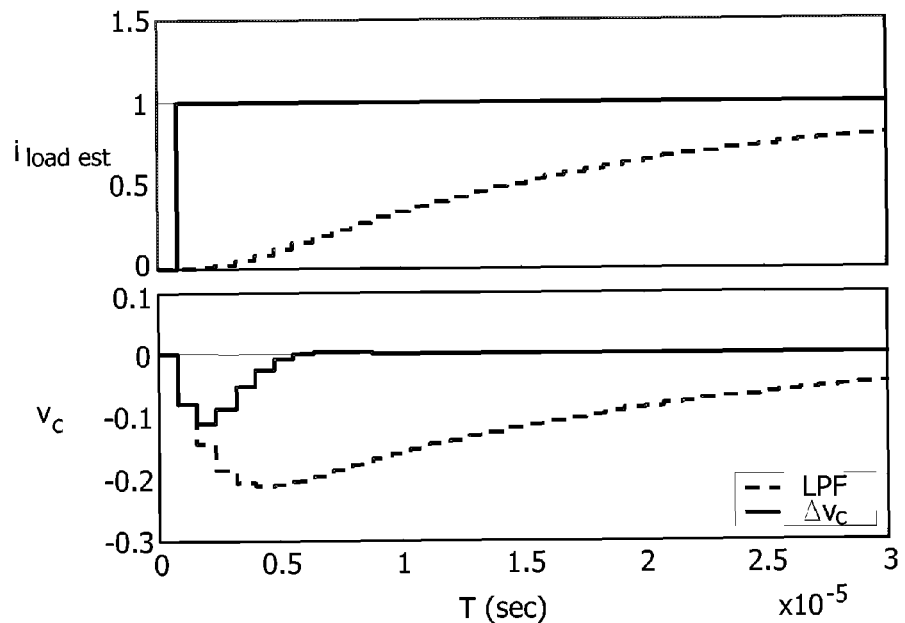
FIG. 11 shows a graph of the estimated load current and the output voltage response for a converter according to FIG. 3.

FIG. 11 shows a graph of the estimated load current and the output voltage response for a converter according to FIG. 3. A first analysis is the step response to a load current step of 1 unit at time 0. Here, the response of the load current estimator in the upper graph and the response of the output voltage of the buck converter in the lower graph are shown. The solid lines represent the response for the $\Delta v_C$ estimator and it can be seen that the estimate of the load current is correct in 1 period. With the chosen controller gains, the output voltage error is back to almost zero in 5 periods. The dashed lines give the response for the LPF estimator and it can directly be seen that it takes much more time for this estimator to come to the correctly estimated load current. Because of that, it also takes longer for the complete state feedback system to regulate the output voltage error to zero again. Clearly, for a fast response of the system to load changes the $\Delta v_C$ estimator is the best solution.

Figure 12:
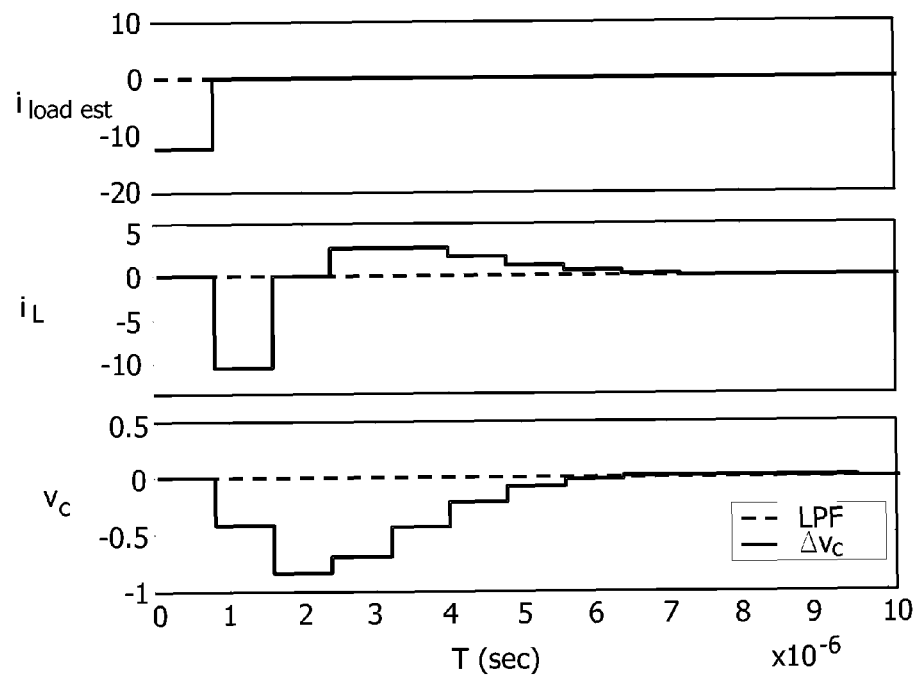
FIG. 12 shows a graph of a response of the estimated load current, a inductor current and a capacitor voltage.

FIG. 12 shows a graph of a response of the estimated load current $i_{Load\ est}$, inductor current $i_L$ and capacitor voltage $V_C$. A second analysis considers the sensitivity of the estimator and the system to variations and noise in the measured state variables. Because of the use of AD converters in a controller, there will always be quantization noise in the measured signals. Especially the noise in the measured capacitor voltage can have significant influence. The $\Delta v_C$ estimator is sensitive for changing voltages in order to respond fast, but this makes it also sensitive for noise. For large delta $v_C$, the relative error because of quantization is small, but for delta $v_C$ around zero the relative error is large. The following calculation shows this should not be neglected.

Assume the load is constant and the capacitor voltage has a small ripple around the desired value. Because the capacitor voltage is measured with an AD converter, the output can toggle between two quantization levels. With a quantization stepsize of 5 mV, the output capacitor of 10 μF and the period time of 0.8 μs (1.25 MHz), the step in the load current estimation due to a single voltage quantization step will be 10 μF/0.8 μs*5 mV=12.5*5 m=62.5 mA. Hence when the capacitor voltage changes marginally but results in one quantization step of 5 mV, the controller will respond to this by trying to change the inductor current by a huge 62.5 mA. The adverse effect of this can be seen in FIG. 12, where the response of the estimated load current, inductor current and capacitor voltage with closed loop control is given for the case of a voltage quantization step of 1 at time=0. The solid lines give the response in case the $\Delta v_C$ estimator is used. It is clear that because of the voltage quantization step, the estimated load current in the top graph is different for one period. The controller responds by trying to make the inductor current equal to the estimated load current, which can be seen in the middle graph. In the bottom graph the effect on the capacitor voltage is shown.

The dashed lines show the response if the LPF estimator is used and it is clear, that this estimator does not depend on the voltage quantization step. The LPF estimation only depends on the measured inductor current and the accuracy during constant conditions of this estimation can be at least as high as the measured inductor current itself. This makes the LPF estimator the best solution during constant conditions.

As shown above, the estimator with the LPF is slow but accurate, thus perfect for constant load conditions, while the $\Delta v_C$ estimator is fast but very noise sensitive. To get an estimator, which is both fast and accurate, both types need to be combined: for constant conditions with a constant load current, the LPF estimation will be used. During changing conditions after a load change, the $\Delta v_C$ estimator is used. To make this possible it is necessary to differentiate between the load conditions. During constant load conditions, the capacitor voltage is constant, while a significant change in the load condition will always give a noticeable change in the capacitor voltage. So the capacitor voltage can be used to differentiate between the load conditions; when the delta $v_C$ is small, the load condition is constant and the LPF estimator will be used. When the delta $v_C$ exceeds a certain limit, the conditions are changing and the $\Delta v_C$ estimator will be used.

The $\Delta v_C$ estimation only depends on the measurement data from the last two periods, so it can directly be used when conditions are changing. The LPF estimation, because of its infinite impulse response, depends on more than two periods from the past. Hence extra measures are necessary, when the conditions are constant again after they changed and the estimator switches back from the $\Delta v_C$ estimation to the LPF estimation. The influence from the past on the LPF estimation needs to be reset, because this is not relevant anymore for the new constant condition. This is achieved by using the last value from the $\Delta v_C$ estimator as the initial value for the LPF estimator.

Figure 13:
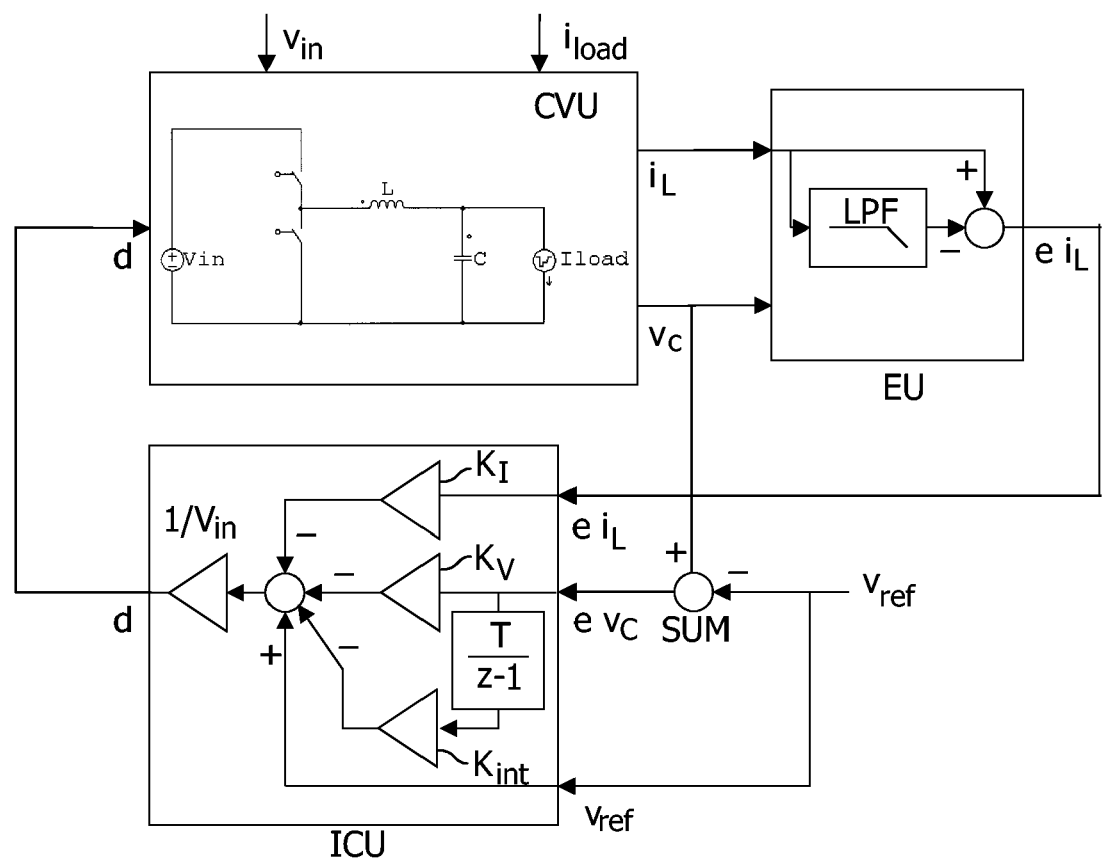
FIG. 13 shows a block diagram of the converter system according to a tenth embodiment.

FIG. 13 shows a block diagram of the converter system according to a tenth embodiment. The converter includes the converter CVU, the estimator EU, controller and reference input ICU. An integrator is added to the controller to compensate for all types of offset and delay in the system.

Figure 14:
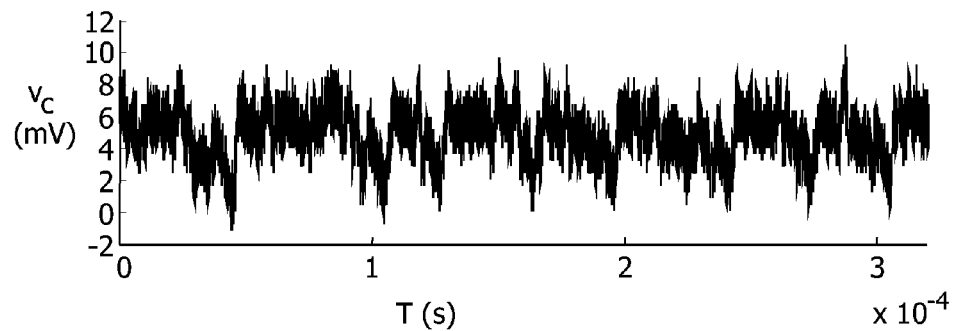
FIG. 14 shows a graph of the measurement capacitor voltage error as a function of time for steady state conditions.

FIG. 14 shows a graph of the measurement capacitor voltage error as a function of time for steady state conditions. Measurements were performed on the prototype board. The ripple on the capacitor voltage during steady state and the loadstep responses are of main interest.

The complete system including buck converter and measurement circuit were modeled in Matlab Simulink to simulate the system. The clock frequency used for the duty cycle generator was 160 MHz. This gives 160 MHz/1.25 MHz=128 possible steps for the duty cycle. The quantization stepsizes for respectively the inductor current and capacitor voltage measurement were 12.5 mA and 3.125 mV. With 6 bit AD converters, this gives a measurement range of 0.8 A and 0.2V. The estimator and controller were also written in VHDL. This VHDL code could then be programmed into a FPGA prototype board, also containing the buck converter and measurement circuit with AD converters.

When looking at the ripple on the capacitor voltage, different sources can be distinguished. Firstly, a ripple is present because of the switching action of the converter as the capacitor is partly charged and discharged each period, here called switching ripple. Secondly, the controller adds ripple, because of its finite resolution, here called control ripple. Together both types of ripple give the total ripple seen at the capacitor voltage. The switching ripple depends on the system characteristics and for the given buck converter, with an input voltage of 3V, a reference voltage of 1.5V and the ESR of the capacitor neglected, it can be calculated to be around 2.7 mV peak-peak and 1 mV RMS.

Figure 15:
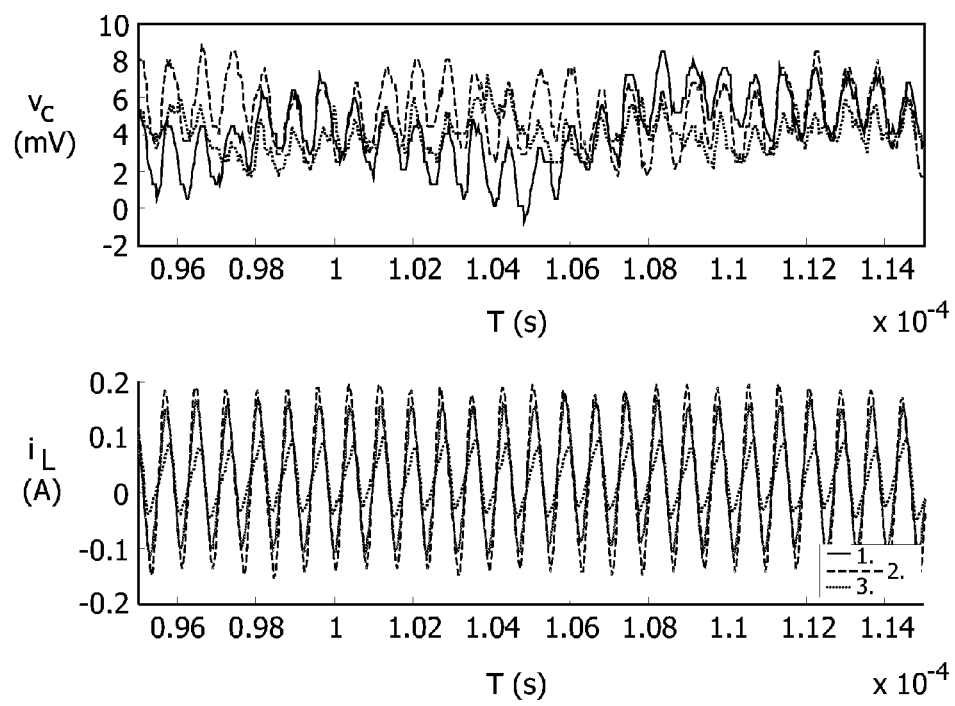
FIG. 15 shows a graph of measured capacitor voltage error and inductor current during steady state conditions.

FIG. 15 shows a graph of measured capacitor voltage error $v_C$ and inductor current $i_L$ during steady state conditions. Here, the steady state capacitor voltage error and inductor current are shown on a smaller timescale. This is done for in total 3 measurements, for different input voltages of 3V, 4V and 2V. The difference in the inductor current, because of the different input voltage is clear. The measurement results of the error in the capacitor voltage are shown for the steady state condition, with a load of 50Ω giving a load current of 30 mA. The RMS total ripple voltage is only 1.8 mV. The peak-to-peak total ripple voltage is around 10 mV. By looking at one sample per switching period, the RMS control ripple voltage is determined to be 1.4 mV.

Figure 16:
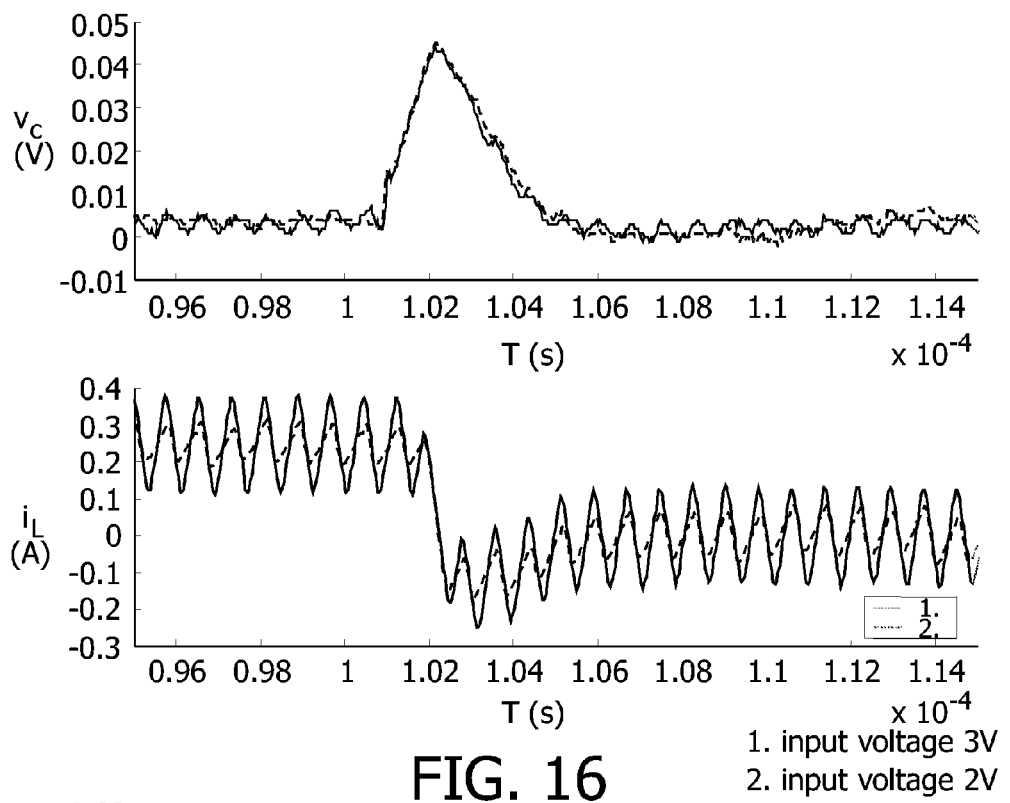
FIG. 16 shows a graph of the measured capacitor voltage error and the inductor current.
Figure 17:
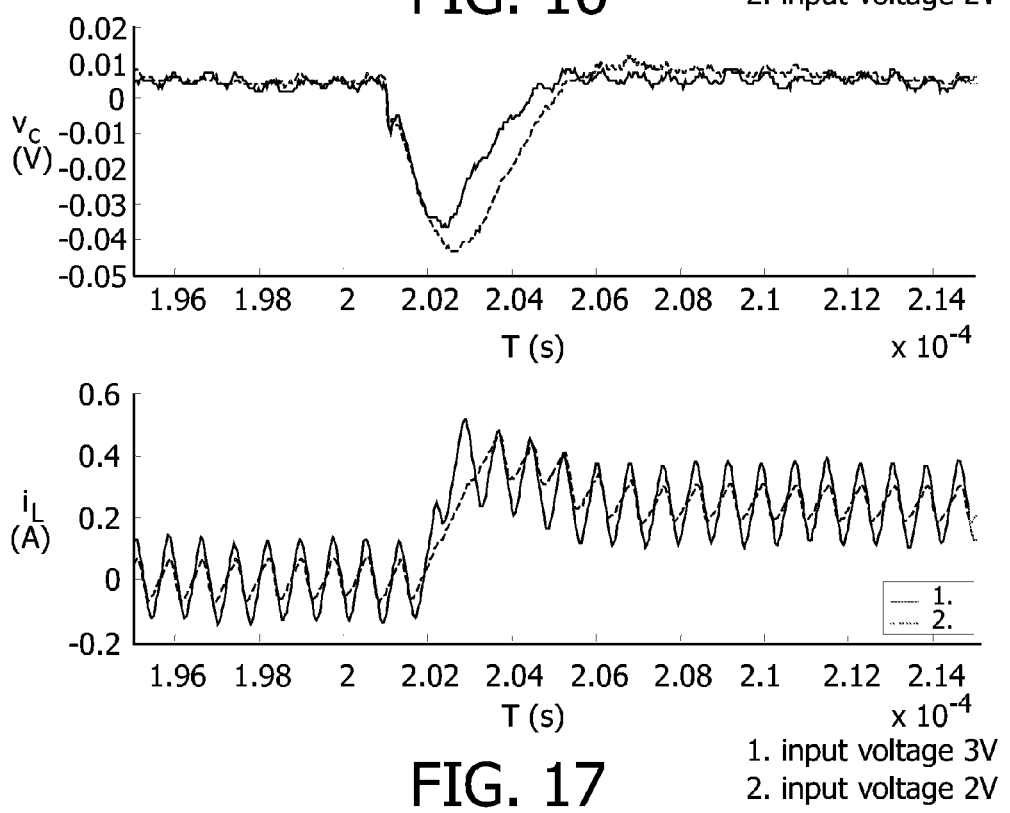
FIG. 17 shows a graph of the measured capacitor voltage error and inductor current.

FIG. 16 shows a graph of the measured capacitor voltage error $U_C$ and the inductor current $i_L$ and FIG. 17 shows a graph of the measured capacitor voltage error and inductor current. To measure the loadstep response, a load of 6 ohm was switched on and off at 5 kHz. With the output voltage of 1.5V this means load current steps of 250 mA. In FIG. 16 and FIG. 17, the responses on respectively the negative and positive loadstep are shown for input voltages of 3V and 2V. It can be seen that the response of the controller is very fast. The capacitor voltage only drops or rises around 40 mV, for the given load current steps of 250 mA. Also the capacitor voltage is regulated back to the reference voltage very fast, within 4 µs or 5 switching periods. The response is the same for both input voltages shown, except for the positive load current step according to FIG. 17. Here the small difference between the input voltage of 2V and the capacitor voltage of 1.5V limits the rate with which the inductor current can increase, thereby increasing the voltage drop a little.

Figure 18:
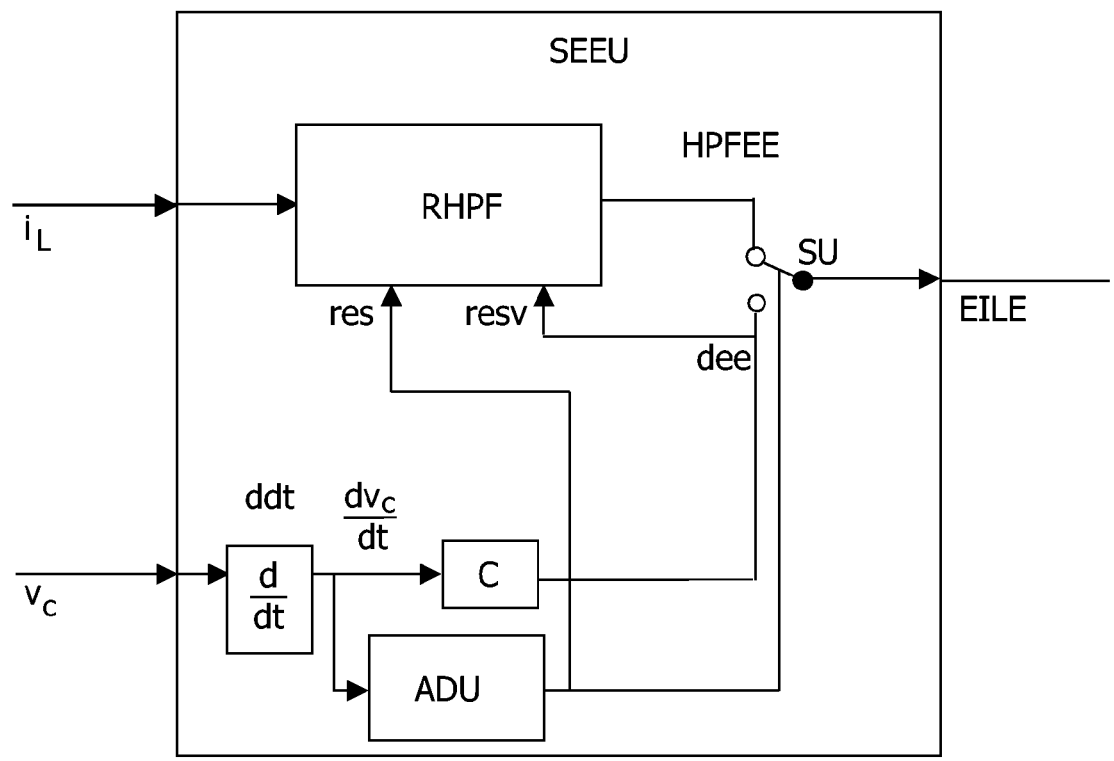
FIG. 18 shows a block diagram of a switching error estimator according to the eleventh embodiment.

FIG. 18 shows a block diagram of a switching error estimator according to the eleventh embodiment. Here, a continuous time switching error estimator SEEU is shown for a buck converter. The switching error estimator unit SEEU receives the inductor current and the capacitor voltage $v_C$ and outputs an estimation on the error of the inductor current $i_L$. The switching error estimator unit SEEU comprises a resettable high-pass filter unit RHPF, a d/dt block ddt and an amplitude detector unit ADU. Instead of using the low-pass filter as in the above-mentioned embodiments, the switching error estimator SEEU according to the eleventh embodiment uses a resettable high-pass filter RHPF for receiving the inductor current $i_L$ and for outputting an error estimation HPFE. Accordingly, the resettable high-pass filter RHPF constitutes the accurate estimator. The capacitor voltage $v_C$ is received by the d/dt block ddt and a derivative of the capacitor voltage is obtained and multiplied with the capacitance value C. The output dee thereof constitutes an estimation on the error of the required inductor current.

As in the above embodiments, the amplitude detector ADU is used to switch between the output of the resettable high-pass filter RHPF and the output of the multiplying unit C.

In contrast to the above-mentioned embodiments, the switching error estimator unit SEEU according to the eleventh embodiment does not estimate the required inductor current but the error in the required inductor current. Accordingly, this estimation can directly be used by the controller. As in the other above-mentioned embodiments, a first estimator is used during constant conditions when an accurate control is important and a second estimator is used during changing conditions, when a fast response is important. The accurate control in the first estimator, i.e. RHPF is possible as the measured inductor current $i_L$ is used as input. A fast response is possible by using the changes in the capacitor voltage $v_C$.

According to a further embodiment of the invention based on the eleventh embodiment, an estimator may also be provided for a discrete time case.

In addition or alternatively, the fast response estimator may also use the capacitor current as input signal if it is possible to measure this capacitor current correctly.

Accordingly, load current can be estimated very accurately as well as very fast with a combination of two different approaches: low-pass filtering the inductor current and measuring the voltage change on the output capacitor. The method has the advantage over a classical current measurement through a series resistance that no additional dissipation is introduced, and that there is no need for a highly sensitive opamp. This provides a means to apply highly accurate control algorithms, which are known to be close to optimal, such as the state feedback algorithm. Measurements on a prototype implementation of such a state feedback algorithm with the load current estimator confirm that the step response of such a controller is less than 5 switching periods, and that the final output voltage is obtained highly accurately.

The above described DC-DC converter can be implemented as a DC-DC down and up converter, in particular for battery application used for example with cellular phones and MP3 or media players. Alternatively, the above described converters may also include point of load (POL) DC-DC converters or VRA for higher power applications.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. A DC-DC converter, comprising:
a first estimator unit configured to perform an accurate control signal estimation;
a second estimator unit configured to perform a fast control signal estimation;
a switching unit configured to switch to an output of the first estimator unit during substantially constant control signal conditions and to switch to an output of the second estimator unit during substantially changing control signal conditions to provide an estimation on the required control signal;
an inductor and an output capacitor coupled to a load;
wherein the first estimator unit is configured to estimate a required inductor current for a load by measuring a low frequency part of an inductor current;
wherein the second estimator unit is configured to estimate a second required inductor current for a load by measuring voltage changes on the output capacitor; and
wherein the second estimator unit receives the voltage of the output capacitor and the inductor current at the start and the end of a previous period and outputs an estimation on the required inductor current based on a subtraction of a capacitor current from the measured inductor current, wherein the capacitor current is determined by multiplying the voltage changes on the output capacitor with the value of the output capacitance and by dividing this by the time period.

2. A DC-DC converter, comprising:
a first estimator unit configured to perform an accurate control signal estimation;
a second estimator unit configured to perform a fast control signal estimation;
a switching unit configured to switch to an output of the first estimator unit during substantially constant control signal conditions and to switch to an output of the second estimator unit during substantially changing control signal conditions to provide an estimation on the required control signal;
an inductor and an output capacitor coupled to a load;
wherein the first estimator unit is configured to estimate a required inductor current for a load by measuring a low frequency part of an inductor current;
wherein the second estimator unit is configured to estimate a second required inductor current for a load by measuring voltage changes on the output capacitor; and
wherein the second estimator unit receives the voltage of the output capacitor and the inductor current and outputs an estimation on the required inductor current based on a subtraction of a capacitor current from the measured inductor current, wherein a derivative of the output capacitor voltage is multiplied with the value of the output capacitance to determine the capacitor current.

3. A DC-DC converter, comprising:
a first estimator unit configured to perform an accurate control signal estimation;
a second estimator unit configured to perform a fast control signal estimation;
a switching unit configured to switch to an output of the first estimator unit during substantially constant control signal conditions and to switch to an output of the second estimator unit during substantially changing control signal conditions to provide an estimation on the required control signal;
an inductor and an output capacitor coupled to a load;
wherein the first estimator unit is configured to estimate a required inductor current for a load by measuring a low frequency part of an inductor current;
wherein the second estimator unit is configured to estimate a second required inductor current for a load by measuring voltage changes on the output capacitor;
wherein the second estimator unit receives the voltage of the output capacitor and a duty cycle and outputs an estimation on the required inductor current; and
wherein the estimation is performed by subtracting the capacitor current from a result of a multiplication of a measured inductor current with one minus the duty cycle and by dividing the result of the subtraction by a result of low pass filtering of one minus the duty cycle, wherein the capacitor current is determined by multiplying the voltage changes on the output capacitor with the value of the output capacitance and by dividing the result thereof by the time period.

4. A DC-DC converter, comprising:
a first estimator unit configured to perform an accurate control signal estimation;
a second estimator unit configured to perform a fast control signal estimation;
a switching unit configured to switch to an output of the first estimator unit during substantially constant control signal conditions and to switch to an output of the second estimator unit during substantially changing control signal conditions to provide an estimation on the required control signal;
an inductor and an output capacitor coupled to a load;
wherein the first estimator unit is configured to estimate a required inductor current for a load by measuring a low frequency part of an inductor current;
wherein the second estimator unit is configured to estimate a second required inductor current for a load by measuring voltage changes on the output capacitor;

wherein the second estimator unit receives the voltage of the output capacitor and the input inductor current and the duty cycle and outputs an estimation on the required inductor current; and wherein the estimation is performed by subtracting the capacitor current from a result of a multiplication of a measured inductor current with one minus the duty cycle and by dividing the result of the subtraction by a result of low pass filtering of one minus the duty cycle, wherein a derivative of the output capacitor voltage is multiplied with the value of the output capacitance to determine the capacitor current.

* * * * *